United States Patent [19]
Horijon

[11] Patent Number: 5,329,358
[45] Date of Patent: Jul. 12, 1994

[54] DEVICE FOR OPTICALLY MEASURING THE HEIGHT OF A SURFACE

[75] Inventor: Joseph L. Horijon, Eindhoven, Netherlands

[73] Assignee: U.S. Philips Corporation, New York, N.Y.

[21] Appl. No.: 827,192

[22] Filed: Jan. 28, 1992

[30] Foreign Application Priority Data

Feb. 6, 1991 [NL] Netherlands ............ 9100205

[51] Int. Cl.$^5$ .............................. G01B 11/24
[52] U.S. Cl. ........................ 356/375; 356/376
[58] Field of Search ............ 356/1, 4, 371, 373, 356/375, 376; 250/560, 561

[56] References Cited

U.S. PATENT DOCUMENTS

| | | | |
|---|---|---|---|
| 4,681,450 | 7/1987 | Azzam | 356/367 |
| 4,808,003 | 2/1989 | Kessels | 356/375 |

FOREIGN PATENT DOCUMENTS 60-194301 10/1985 Japan .
0075303 4/1987 Japan .
0073214 3/1989 Japan .

Primary Examiner—F. L. Evans
Attorney, Agent, or Firm—William L. Botjer

[57] ABSTRACT

The height of a surface (21) is determined by measuring the position of a radiation spot (11) located on the surface (21). The radiation spot (11) is formed by a narrow incident beam (10). Radiation reflected in the radiation spot (11) is projected on two position-sensitive radiation detection systems (41, 42). The detection systems (41, 42) are arranged at a different optical distance from the radiation spot (11). With the aid of a partially transparent mirror (3), or in a different manner, it is ensured that the intensity distribution on the detection systems (41, 42) is uniform. A line (G) through the radiation spot (11) is constructed by determining the same characteristic point ($G_I$, $G_{II}$), for example, the point of gravity in the intensity distributions at different optical distances from the radiation spot (11). The height of the spot (11) and hence of the surface (21) is determined by means of this line.

9 Claims, 3 Drawing Sheets

DEVICE FOR OPTICALLY MEASURING THE HEIGHT OF A SURFACE

BACKGROUND OF THE INVENTION

The invention relates to a device for optically measuring the height of a surface of an object, which device comprises a radiation source unit for generating a radiation beam and for forming an essentially stationary radiation spot on the surface by means of said beam, means for selecting a reflected beam from the radiation reflected by the surface in the radiation spot, and a position-sensitive radiation detection system arranged in the radiation path of the reflected beam. An essentially stationary radiation spot is understood to mean that movement of the spot during a measurement is not necessary.

Such a device is used, for example, to check whether a surface has the desired profile, for example, whether a flat plate is really flat and does not have any grooves or projections. The device may also be used to check whether holes and elevations are provided at the correct positions on a substrate plate and it may further be used, for example, for inspecting electronic circuits comprising electrically insulating plates provided with conducting metal strips and electronic components.

A device as described in the opening paragraph is known, inter alia, from EP-A 0,134,597. This document describes a device for performing a triangulation so as to determine the distance between the surface of an object and a reference level. The known device comprises a radiation source from which a narrow radiation beam is incident on the surface where it forms a radiation spot. The radiation spot is focused on a linear radiation-sensitive detector surface by means of one or more objective lenses. The pupil of the objective system selects a reflected beam coming from the radiation spot. The position where the radiation spot is imaged on the detector surface indicates where the radiation beam incident on the object surface impinges upon the latter surface, and hence indicates the height of this surface. A displacement of the position of the radiation across the detector surface involves a change of the surface height of the object to be measured.

The sensitivity of the height measurement, i.e. the ratio between the change of the surface height and the displacement of the position of the incident radiation across the detector surface is dependent, inter alia, on the focusing of the image of the radiation spot on the surface of the position-sensitive radiation detection system. In order to maintain this image focused at any height, the detector surface should be tilted with respect to the direction from which radiation is incident on the surface. Due to such a tilt the fraction of the radiation which contributes to the electric output signal of the detector will decrease, thus rendering the detection system more insensitive.

SUMMARY OF THE INVENTION

One of the objects of the invention is to provide an optical height meter in which the position-sensitive radiation detection system can be arranged substantially transversely to the reflected beam without detrimentally influencing the sensitivity of the height measurement.

To this end the device for optically measuring the height of an object according to the invention is characterized in that a beam splitter for splitting-off a sub-beam is arranged in the radiation path of the reflected beam and in that a further position-sensitive radiation detection system whose optical distance to the beam splitter differs from the optical distance between the previously mentioned position-sensitive radiation detection systems and the beam splitter is arranged in the radiation path of said sub-beam. The invention is based on the recognition that the shape of the intensity distribution in the reflected beam remains the same when it traverses the free space. In other words, in the intensity distributions of the beam at different distances from the radiation spot the same characteristic point is located each time on the same straight line through the radiation spot. Different characteristic points are located on different lines which intersect each other in the radiation spot. A line through the radiation spot can be reconstructed by determining the same characteristic point in the intensity distributions at different distances from the radiation spot by means of the position-sensitive radiation detection systems. This is in contrast to the known triangulation in which the line to be reconstructed traverses the optical centre of the imaging lens and the image of the radiation spot on the detection system.

The device according to the invention has the advantage that the measuring result is hardly influenced by the way in which the incident radiation beam is reflected on the surface as long as the selected reflected beam has a sufficient intensity and as long as the radiation spot is not imaged in focus on the position-sensitive radiation detection system.

It is to be noted that it is known per se from EP-A-0,227,136 to arrange two position-sensitive radiation detection systems at a mutually different distance in an optical height meter. However, in the known device the radiation spot is generally moved across the surface during a measurement and is thus not essentially stationary. Moreover, the amplitudes of the corresponding movements across the radiation detection systems are determined, rather than the positions of given characteristic points in the intensity distributions.

A preferred embodiment of the device according to the invention is characterized in that the direction of the radiation path of said radiation beam substantially coincides with the direction of the radiation path of said reflected beam. Since in this embodiment the angle between the incident radiation beam and the selected reflected beam is small, steep height changes can be measured without the detrimental influence of shadows on the surface.

Various parameters can be chosen as characteristic points in the radiation distribution. An embodiment of the device according to the invention is characterized in that the position-sensitive radiation detection systems are adapted to determine the position of the maximum or of the median in the intensity distribution incident on the radiation detection system. If the detection systems comprise a large number of discrete cells, for example, a series of photodiodes or a CCD sensor, it is fairly easy to detect that cell on which the largest amount of radiation is incident. It is neither difficult to divide the detector into two contiguous parts by means of a microprocessor, with an equal amount of radiation being incident on each part. The boundary line between the two parts is the position of the median in the radiation distribution.

Another embodiment is characterized in that the position-sensitive radiation detection systems are adapted to determine the position of the point of gravity in the intensity distribution incident on the radiation detection systems. The point of gravity of the intensity distribution may also be determined from a number of discrete cells. However, a position-sensitive radiation detection system having two outputs is preferably used, with the output signal at each output being proportional to the intensity and the distance of the incident radiation from said output. The normalized difference signal of the two outputs of such a detector is proportional to the position of the point of gravity of the intensity distribution. A position-sensitive radiation detection system of this type is described in EP-A-0,071,667 and in the non-prepublished NL-A 9002211 which corresponds to U.S. patent application Ser. No. 773,384, filed Oct. 7, 1991.

The radiation detection systems used in practice only absorb a portion of the incident radiation while the rest is reflected. Since the radiation entrance plane is generally also polished, the entrance plane functions as a partially transparent mirror and reflects a substantial fraction of the incident radiation beam. An embodiment of the device according to the invention utilizes this aspect and is therefore characterized in that a radiation entrance plane of one of the position-sensitive radiation detection systems is said beam splitter. This renders a separate beam splitter and its positioning superfluous, which means that the height meter comprises fewer components and can be assembled more easily.

A further embodiment of the device according to the invention is characterized in that an imaging optical system is arranged in the radiation path of the reflected beam. By making use of an imaging system, the divergent reflected beam is converted into a convergent beam having an intensity distribution which is of the same form as the distribution in the divergent beam. The position-sensitive radiation detectors may then be considerably smaller than in the absence of the imaging system. The system particularly provides the possibility of selecting a reflected beam having a large angular aperture, so that the total used radiation intensity is large. This system is preferably a lens system, but an imaging mirror system in the form of an ellipsoid or paraboloid having an aperture at two sides is alternatively possible.

This embodiment is preferably further characterized in that the position-sensitive radiation detection systems have a radiation-sensitive surface one end of which coincides with an optical axis of the imaging optical system, and in that the direction of the radiation path of said radiation beam for forming the radiation spot on the surface coincides with the optical axis of the imaging optical system. As a result, the same part of the radiation captured in the pupil of the system is incident on the detectors for any position of the surface.

This embodiment may be further characterized in that each position-sensitive radiation detection system is composed of at least two parts, with the optical axis of the imaging system extending between the parts. Consequently, a plurality of measurements is performed simultaneously with the same optical system. The effect of shadows is then reduced, particularly in the case of steep height changes on the surface.

The invention may be used in a device for scanning a surface by performing a large number of measurements on different points of this surface. Such a device comprises, for example, a radiation source unit for generating a radiation beam and for forming a scanning spot on a surface of an object to be scanned, and means for displacing the scanning spot with respect to the object. For a more complete image of this object not only the measured height of each point can be considered but also the total intensity of the radiation which is incident on the detectors and hence of the colour or reflection coefficient of the surface.

BRIEF DESCRIPTION OF THE DRAWING

These and other more detailed aspects of the invention will be described in greater detail with reference to the accompanying drawings.

In the drawings

DETAILED DESCRIPTION OF THE PREFERRED EMBODIMENTS

Figure 1:
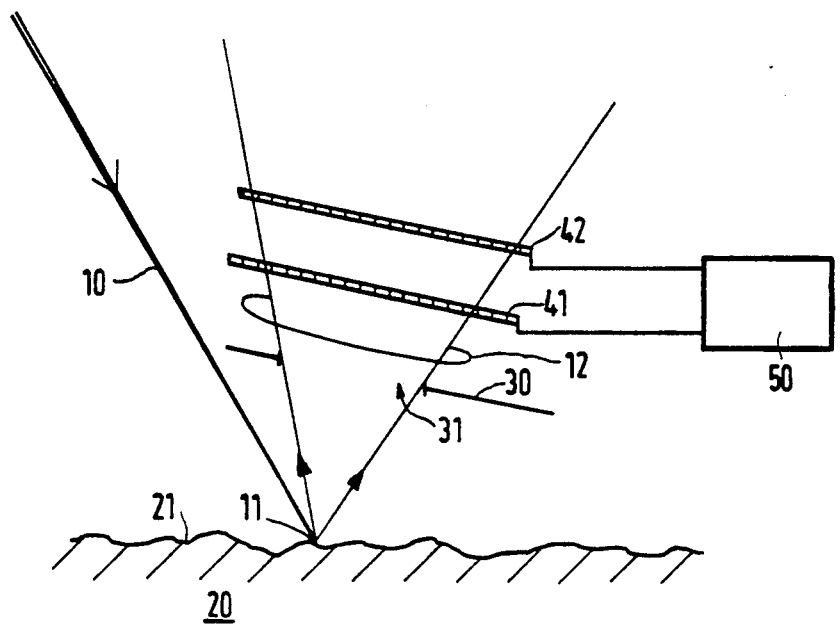
FIG. 1 shows diagrammatically the principle of the optical height meter according to the invention.

FIG. 1 shows diagrammatically a device for optically measuring the height of a surface. A radiation beam 10 is incident on the surface 21 of an object 20. The radiation beam 10 forms a radiation spot 11 on the surface. To obtain a small radiation spot at different heights of the surface, the beam 10 has a small aperture and is emitted by, for example, a laser. The radiation of the beam is reflected in the spot 11, generally partly in a diffuse manner and partly in a specular manner. A reflected beam is selected from the reflected radiation by means of, for example, a diaphragm 30 having an aperture 31. The selected reflected beam 12 is incident on two position-sensitive radiation detection systems 41 and 42, respectively. The detection systems are located at mutually different optical distances from the spot 11. This can be realised, for example, by means of a partially transparent mirror (not shown).

Apart from selection by means of a diaphragm 30, the beam 12 may alternatively be selected in a different manner, for example, by the choice of the construction of the height meter or by making use of the aperture of an imaging lens. It is then only essential that the intensity distribution in the selected beam 12 reaches the two position-sensitive radiation detection systems.

The two position-sensitive radiation detection systems 41 and 42 comprise means for determining a characteristic point of the distribution of radiation incident on the systems. If the detection systems comprise a large number of radiation-sensitive detection cells, for example, a series of photodiodes or a CCD sensor, these systems may be connected to, for example, a separate processing unit 50.

The shape of the radiation intensity distribution in the selected beam 12 remains the same as long as the beam traverses the free space. A characteristic point in the intensity distribution, for example, the maximum intensity is located on one and the same line for different consecutive cross-section of the beam and may therefore be assumed to be a single ray. A line passing through the radiation spot 11 on the surface 21 is found by determining the position of the characteristic point at two different cross-sections. Furthermore, the radiation spot 11 is located on the line which is followed by the incident radiation beam 10. The point of intersection of the two lines indicates the position of the radiation spot 11 and thus the local height of the surface 21.

Figure 2:
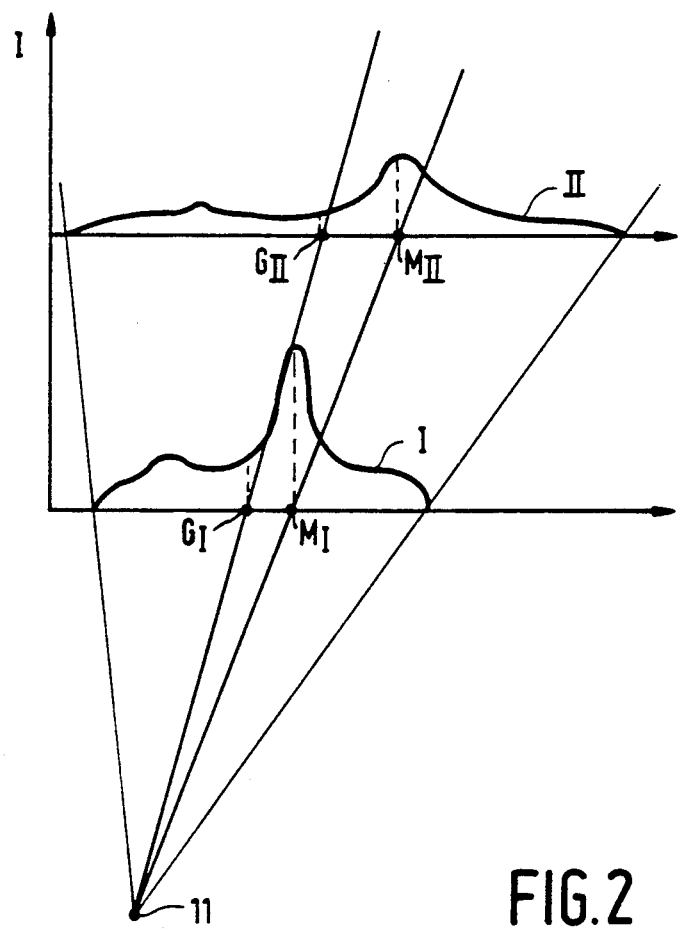
FIG. 2 shows a possible intensity distribution at two different positions.

FIG. 2 illustrates the operation of the height meter according to the invention. The intensity distributions I and II in the beam are measured at two different locations or cross-sections. The positions of the maximum intensity $M_I$ and $M_{II}$ are indicated as characteristic points and the points of gravity of the intensity distribution are indicated by $G_I$ and $G_{II}$.

In a detection system comprising a large number of cells the maximum can easily be found by selecting that cell receiving the largest amount of radiation. The position of the point of gravity can be determined by determining the intensity-weighted average of the cell positions in accordance with the formula:

$$G = \frac{\sum_i x_i I_i}{\sum_i I_i} ; \tag{1}$$

in which $x_i$ is the position of the cell i, $I_i$ is the intensity incident on said cell, while the summation covers all cells. Another characteristic point is the median, being the position whose total intensity at both sides is equal. Other points for characterizing the position of the intensity distribution can also be determined by means of statistical techniques. Furthermore, such techniques enable to determine the position of a characteristic point with an accuracy greater than the accuracy given by the width of a cell.

By using more than one type of characteristic point, more lines through the radiation spot 11 can be reconstructed. In principle, it is then possible to measure the height of the surface without knowing the direction of the incident radiation beam.

Figure 3:
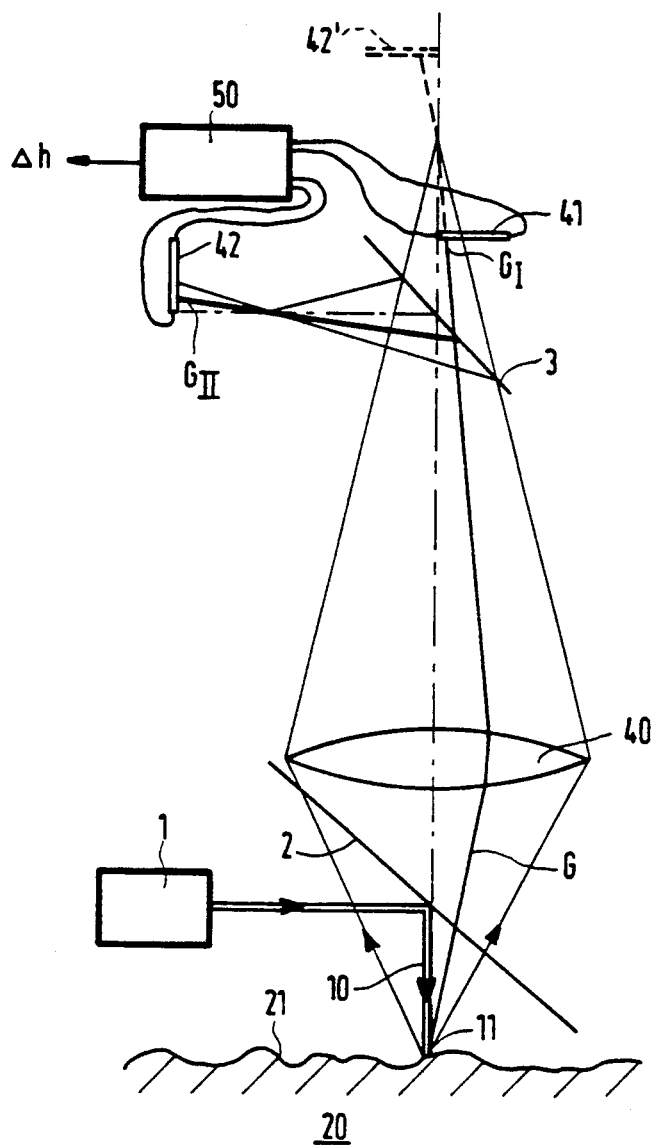
FIG. 3 shows a first embodiment of the optical height meter according to the invention.

FIG. 3 shows a first embodiment of a device according to the invention. A radiation source unit 1, for example, a laser comprising a collimation system generates a narrow radiation beam 10. A partially transparent mirror 2 deflects the beam towards the surface 21 to be measured where it forms a radiation spot 11. Radiation reflected in this spot is received in an imaging optical system 40, for example, a lens system. It is alternatively possible to use an internally reflecting, ellipsoid or paraboloid mirror whose sides remote from and facing the surface 21 are apertured. Such a mirror may be, for example, rotationally symmetrical or anamorphotic. The radiation beam selected by means of the system 40 is split by a second partially transparent mirror 3 into two subbeams each of which is incident on a position-sensitive radiation detection system 41, 42, respectively. These two detection systems are arranged in such a way that the shape of the distribution of radiation incident thereon is similar. This is achieved, for example, by causing the edge of the detection systems to coincide with a line through the radiation spot 11 and the optical centre of the imaging system 40. To ensure that the radiation spot 11 is located on the line through the optical centre and the edges of the detection systems, the beam 10 should be incident on the surface 21 along this line.

In the embodiment of FIG. 3 this condition is satisfied by causing the optical axis of the imaging system 40 to coincide with the incident beam 10 and the edges of the detection systems 41 and 42. In this embodiment the selected part of the radiation reflected in the radiation spot is therefore determined by half the lens 40 and the positioning of the detection systems 41 and 42. The line on which the points of gravity at different cross-sections of this selected reflected beam are located is indicated by G in the FIG. 3 and the position of this point of gravity on the detection systems is indicated by $G_I$ and $G_{II}$, respectively.

To measure the point of gravity as a characteristic point, detection systems should preferably be used for which the position of the point of gravity can be directly derived from the output signals of the detection systems. Such detection systems are described in, for example, EP-A 0,071,667 and NL-A 9002211.

In a simpler embodiment, which is quite satisfactory, the detection systems cover the entire beam and the incident beam 10 extends at an angle to the optical axis of the imaging system. This angle may be fairly large, for example, 160°.

Figure 4:
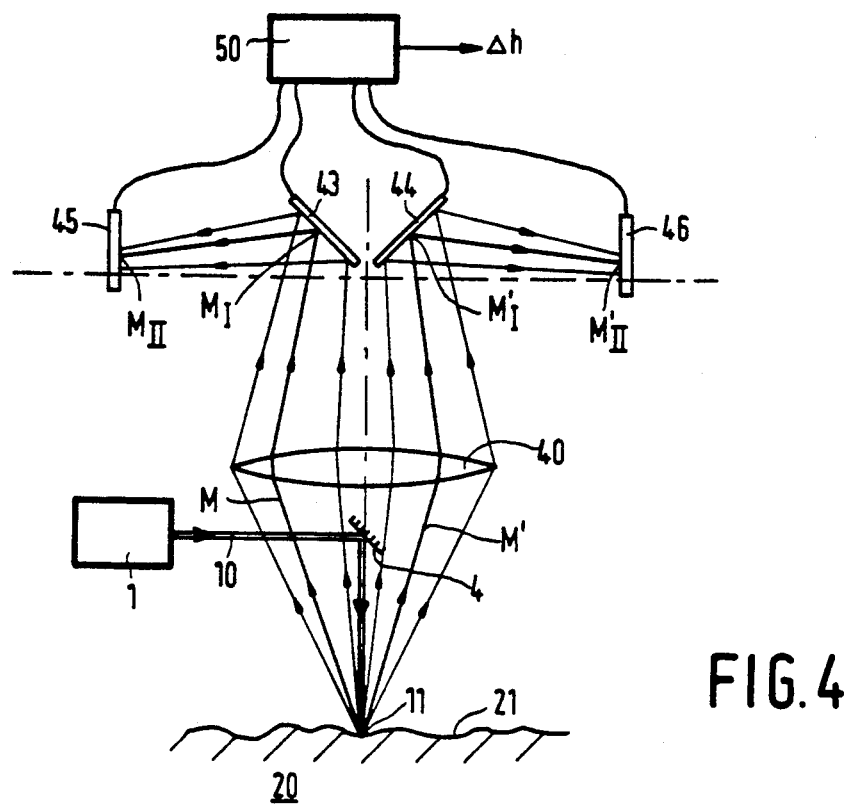
FIG. 4 shows a second embodiment.

A further embodiment is shown diagrammatically in FIG. 4. The beam 10 generated in a radiation source unit 1 is incident via a small mirror 4 on the surface 21 where it forms the radiation spot 11. A part of the radiation reflected by the surface 21 is captured by the imaging system 40 and is subsequently incident on two position-sensitive radiation detection systems 43 and 44. The beam incident on each detection system is determined by the pupil of the imaging system 40 and by the size of the mirror 4 which shields a central part of the imaging system. The position-sensitive radiation detection systems 43 and 44 have flat polished front sides which reflect a substantial part, for example, 20% of the incident radiation. These front sides, or radiation entrance planes, thus constitute, as it were, partially transparent mirrors by which the non-absorbed radiation is reflected. These radiation beams are subsequently incident on the position-sensitive radiation detection systems 45 and 46, respectively.

In the Figure lines of a point characteristic of the beam are denoted by M and M' in the beams incident on the detection systems 43 and 44, respectively. The location where the line M is incident on the position-sensitive radiation detection systems 43 and 45 is denoted by $M_I$ and $M_{II}$, respectively, and the location where the line M' is incident on the systems 44 and 46 is denoted by $M_I'$ and $M_{II}'$, respectively.

Each of the four detection systems is connected to the processing unit 50 in which the positions of the points $M_I$, $M_{II}$, $M_I'$ and $M_{II}'$ are determined and in which the height $\Delta h$ of the surface 21 at the location of the radiation spot 11 is computed from these positions, using known optical and geometrical parameters of the height meter.

The use of two pairs of detection systems has the advantage that a steep height change on the surface does not lead to a complete loss of information about the height of the surface in situ. The effect of shadows as a result of this height change will generally influence only one of the measurements. Instead of two pairs of detection systems, also more pairs of detection systems are possible which may then be arranged, for example, radially around the optical axis of the imaging system.

Figure 5:
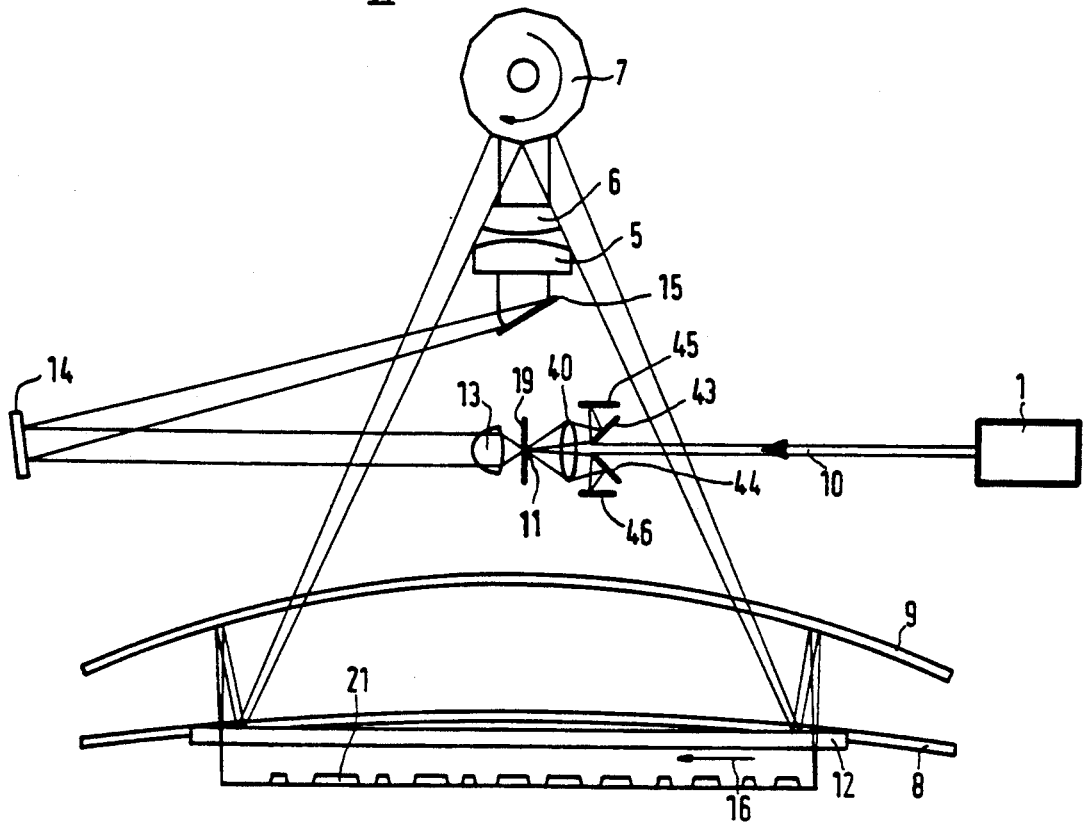
FIG. 5 shows an embodiment of a scanning optical height meter.

FIG. 5 shows a scanning optical height meter according to the invention, for example, for scanning PCBs (printed circuit boards).

The radiation source unit comprises a laser 1 which generates a collimated laser beam 10. The laser beam 10 is incident on the imaging lens 40 which focuses the beam in the imaginary plane 19. The laser beam then traverses a cylindrical lens 13, is reflected by the folding mirrors 14 and 15, traverses an imaging lens or imaging system comprising the lenses 5 and 6 and is deflected via a rotating polygon mirror 7 towards the surface 21 to be scanned. Correction mirrors 8 and 9 and a further cylindrical lens 12, which extends throughout the width to be scanned, are arranged between the polygon 7 and the surface 21 to be scanned. Ultimately, the laser beam forms a scanning spot by the surface 21, which scanning spot moves across the surface in the direction of the arrow 16 as a result of the rotation of the polygon mirror 7. The radiation reflected on the surface traverses the optical system in the reverse direction and forms an image 11 on or near the imaginary plane 19. This image is detected by means of a height measuring device as described hereinbefore. The entire surface 21 is scanned by moving the PCB in the direction transverse to the scanning direction.

The height measuring device has, for example, a double construction for obtaining a more accurate measurement and for avoiding shadows. The device comprises the imaging system 40 whose optical axis coincides with the chief ray of the laser beam 10. The imaging system 40 concentrates the radiation from the spot 11 in an unfocused manner on the position-sensitive radiation detection systems 43 and 44. The radiation reflected on the front faces of these systems is subsequently incident on the position-sensitive radiation detection systems 45 and 46. The instantaneous height of the radiation spot 11 and hence the presence or absence of a component on the surface of the PCB is determined from the output signals of the radiation detection systems 43, 44, 45 and 46 by means of a processing unit (not shown).

The cylindrical lenses 12 and 13 provide a numerical aperture which is large enough to form an image of sufficient light intensity of the scanning spot 11 on the detection system. More details relating to the scanning device and the cylindrical lenses are described in the non-prepublished NL-A 900100 which corresponds to U.S. patent application Ser. No. 642,249, filed Jan. 16, 1991.

I claim:

1. A device for optically measuring the height of a surface of an object, which device comprises a radiation source unit for generating a radiation beam and for forming an essentially stationary radiation spot on the surface by means of said beam, means for selecting a reflected beam from the radiation reflected on the surface in the radiation spot, and a first position-sensitive radiation detection system arranged in the radiation path of the reflected beam, characterized in that a beam splitter for splitting-off a sub-beam is arranged in the radiation path of the reflected beam and in that a second position-sensitive radiation detection system whose optical distance to the beam splitter differs from the optical distance between the first position-sensitive radiation detection system and the beam splitter is arranged in the radiation path of said sub-beam, both position-sensitive radiation detection systems being for determining the location of the same characteristic point of the radiation distribution on each detection system, the combination of both systems being indicative of the height of the surface.

2. A device as claimed in claim 1, characterized in that the direction of the radiation path of said radiation beam is substantially opposite to the direction of the radiation path of said reflected beam.

3. A device as claimed in claim 1, characterized in that the position-sensitive radiation detection systems are adapted to determine the position of the maximum or of the median in the intensity distribution incident on the radiation detection system.

4. A device as claimed in claim 1, characterized in that the position-sensitive radiation detection systems are adapted to determine the position of the point of gravity in the intensity distribution incident on the radiation detection systems.

5. A device as claimed in claim 1, characterized in that a radiation entrance plane of one of the position-sensitive radiation detection systems is said beam splitter.

6. A device as claimed in claim 1, characterized in that an imaging optical system is arranged in the radiation path of the reflected beam.

7. A device as claimed in claim 6, characterized in that the position-sensitive radiation detection systems have a radiation-sensitive surface one end of which coincides with an optical axis of the imaging optical system, and in that the direction of the radiation path of said radiation beam for forming the radiation spot on the surface coincides with the optical axis of the imaging optical system.

8. A device as claimed in claim 1 further including means for displacing the spot with respect to the object, for measuring the height of the object at any position.

9. A scanning optical height meter as claimed in claim 8, comprising a deflection system for displacing the spot along a line on the surface of the object, and a further optical system for forming a spatial image of a portion of the surface around the spot, said portion being selected via the deflection system.

* * * * *